United States Patent [19]

Smith et al.

[11] 4,108,001
[45] Aug. 22, 1978

[54] UREA COMPOSITION FOR FORMING THERMOPARTICULATING COATING

[75] Inventors: James D. B. Smith, Wilkins Township, Allegheny County; David C. Phillips, Penn Hills, both of Pa.

[73] Assignee: Westinghouse Electric Corp., Pittsburgh, Pa.

[21] Appl. No.: 726,039

[22] Filed: Sep. 23, 1976

[51] Int. Cl.² .................. C09K 3/00; G01K 3/00; G01K 11/00; C08K 5/21; C08L 63/00
[52] U.S. Cl. .................. 73/339 R; 23/230 R; 23/254 R; 252/408; 260/32.6 R; 260/37 EP; 310/52; 310/55; 310/56; 340/577; 30/340
[58] Field of Search .............. 260/37 EP, 32.6 R; 252/408; 73/339 R, 339, 28, 344, 349; 23/230 R, 254 R; 310/52, 55, 56; 340/227 R

[56] References Cited

U.S. PATENT DOCUMENTS

| | | | |
|---|---|---|---|
| 2,855,372 | 10/1958 | Jenkins et al. | 260/31.4 EP |
| 2,909,497 | 10/1959 | Edelman | 260/23 |
| 3,022,190 | 2/1962 | Feldman | 73/339 R |
| 3,427,880 | 2/1969 | Grobel et al. | 73/339 R |
| 3,558,558 | 1/1971 | Porret et al. | 260/37 EP |
| 3,562,215 | 2/1971 | Moore | 260/37 EP |
| 3,573,460 | 4/1971 | Skala | 73/339 R |
| 3,807,218 | 4/1974 | Carson et al. | 73/339 R |
| 3,955,417 | 5/1976 | Smith et al. | 73/339 R |
| 3,957,014 | 5/1976 | Phillips et al. | 252/408 |
| 3,973,438 | 8/1976 | Smith et al. | 73/339 R |
| 3,973,439 | 8/1976 | Smith et al. | 73/339 R |
| 3,995,489 | 12/1976 | Smith et al. | 73/339 R |

*Primary Examiner*—Benjamin R. Padgett
*Assistant Examiner*—T. S. Gron
*Attorney, Agent, or Firm*—R. D. Fuerle

[57] ABSTRACT

A composition is disclosed of a urea compound, a resinous carrier, and a solvent. The composition is applied to a portion of an electrical apparatus which is exposed to a gas stream. The solvent in the composition is evaporated to produce a thermoparticulating coating. When the electrical apparatus overheats the urea compound in the coating forms particles in the gas stream which are detected by the monitor.

30 Claims, No Drawings

UREA COMPOSITION FOR FORMING THERMOPARTICULATING COATING

CROSS-REFERENCES TO RELATED APPLICATIONS

This application is related to application Ser. No. 426,391, filed Dec. 19, 1973, by Emil M. Fort, Thomas D. Kaczmarek and David Colin Phillips, entitled "Sampling System for Power Generators," now U.S. Pat. No. 3,972,225.

This application is also related to application Ser. No. 568,222, filed Apr. 15, 1975, by J. D. B. Smith, J. F. Meier, and D. C. Phillips, entitled "Blocked Isocyanate Composition For Forming Thermoparticulating Coating," now U.S. Pat. No. 4,056,005.

This application is related to application Ser. No. 568,219, filed Apr. 15, 1975, by J. D. B. Smith and D. C. Phillips, entitled "Malonic Acid Derivative Composition For Forming Thermoparticulating Coating," now U.S. Pat. No. 3,995,489.

This application is related to application Ser. No. 468,224, filed Apr. 15, 1975, by J. D. B. Smith and D. C. Phillips, entitled "Diazonium Salt Composition For Forming Thermoparticulating Coating," now U.S. Pat. No. 3,979,353.

This application is related to application Ser. No. 390,284, filed Aug. 21, 1973 by J. D. B. Smith et al., entitled "Composition For Forming Thermoparticulating Coating Which Protects Electrical Apparatus," now U.S. Pat. No. 3,973,438.

This application is related to application Ser. No. 568,221, filed Apr. 15, 1975, by J. D. B. Smith et al., entitled "Metal Acetyl Acetonate Composition For Forming Thermoparticulating Coating," now U.S. Pat. No. 3,973,439.

This application is related to application Ser. No. 568,223, filed Apr. 15, 1975, by J. D. B. Smith, D. C. Phillips, and K. W. Grossett, entitled "Grease Thermoparticulating Coating," now U.S. Pat. No. 3,955,417.

This application is related to application Ser. No. 568,218, filed Apr. 15, 1975, by D. C. Phillips, W. M. Hickam, and J. D. B. Smith, entitled "Multiple Signal Thermoparticulating Coating."

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues, the entire machine may be damaged.

Large rotating electrical apparatus is usually cooled with a hydrogen gas stream. The organic compounds in the apparatus are first to be affected by the overheating and they decompose to form particles which enter the gas stream. Monitors then detect particles in the gas stream and sound a warning or shut down the apparatus when too many particles are detected.

Descriptions of such monitors and how they function may be found in U.S. Pat. No. 3,427,880, entitled "Overheating Detector For Gas Cooled Electrical Machine" and in U.S. Pat. No. 3,573,460 entitled "Ion Chamber For Submicron Particles." Another monitor, "The Condensation Nuclei Detector," is described by F. W. Van Luik, Jr., and R. E. Rippere in an article entitled "Condensation Nuclei, A New Technique For Gas Analysis," in Analytical Chemistry 34, 1617 (1962) and by G. F. Skala, in an article entitled "A New Instrument For The Continuous Detection of Condensation Nuclei," in Analytical Chemistry 35, 702 (1963).

As the hereinbefore cited applications suggest, special coatings may be applied to the apparatus which decompose and form detectable particles at a lower temperature than the usual organic compounds found in the apparatus. Efforts to identify materials which will decompose to form detectable particles (i.e., thermoparticulate) at temperatures closer to the operating temperature of the machine have met with several difficulties. Many compounds, such as maleic acid, fumaric acid, and polyacrylic acid, do not decompose below 190' C. Others such as acetic acid, are liquids which boil and therefore are unsuitable. Some compounds decompose at a low temperature but the decomposition products do not include detectable particles. Compounds such as 1,2-diformylhydrazine have some of the desirable properties but cannot withstand several years operation at 50° to 100° C. A few compounds contain toxic or corrosive substances in their decomposition products which may render them unsuitable.

SUMMARY OF THE INVENTION

We have found that certain urea compounds can be used in a composition to form a thermoparticulating coating. The coating can be made compatible with the other organic compounds in the apparatus. The coating is very stable and can withstand several years operation at 60° or 80° or even 100° C (depending on the particular urea compound used) without decomposing, yet will produce detectable particles when the temperature reaches about 125° to 190° C (depending on the particular urea compound used). Also, when the coating is heated to about the thermoparticulating temperature of the coating it blisters and becomes a very dark brown or black color which is a considerable aid in locating the malfunction.

We have also found that the thermoparticulation products of urea compounds give strong signals in the monitor and very distinctive "finger prints" in a mass spectrometer. Distinctive fingerprints are useful because they enable one to quickly identify the compound which thermoparticulates, and since the exact area in the generator where that compound was used is known, the area of overheating is pinpointed.

The urea compounds of this invention have excellent aging characteristics. One compound thermoparticulated after aging at 100° C and after 3 years at 80° C with a strong signal at the same thermoparticulation temperature as the un-aged compound.

DESCRIPTION OF THE INVENTION

A composition is prepared of a urea compound in a solution of a resinous carrier. The urea compound may be dispersed if it is insoluble in the solvent (e.g., toluene) or it may be in solution if it is soluble in the solvent (e.g., ethyl alcohol or diethyl ether). Dispersions are preferred as they produce much more particulation than do solutions. A particle size of the dispersed urea compound of about 25 to about 1000 microns is suitable.

The composition may be prepared by simply mixing the ingredients, but it is preferable to mix the drier, resinous carrier, and solvent first and then add the urea compound to prevent the occlusion of the drier in the urea compound and thereby obtain a more homogeneous dispersion of the urea compound.

A suitable composition is a resinous carrier, about 20 to about 250 phr (parts by weight per hundred parts of resinous carrier) of the urea compound, and about 25 to about 75% (by weight based on the resinous carrier) of a solvent for the resinous carrier. If the amount of urea compound is less than about 20 phr, the quantity of particles given off during decomposition may be too low to be detected by presently-existing detectors. However, the construction of more sensitive detectors would permit a lower amount of urea compound. If the amount of urea compound exceeds about 250 phr, the composition is thick, difficult to apply, and does not bond well. The preferred amount of urea compound, which generally gives the best results, is about 40 to about 60 phr. If the amount of solvent is less than about 25%, the composition is generally too viscous to apply easily and if the amount of solvent is greater than about 75%, the composition is unnecessarily dilute and the coating may be too thin to produce an adequate number of particles during decomposition, at least while the malfunction is highly localized. Best results are usually obtained with about 45 to about 55% solvent.

The composition also preferably contains about 0.1 to about 3 phr of a drier when the resinous carrier is an epoxy resin or similar resin to promote its room temperature cure. Lead naphthenate or cobalt naphthenate is preferred although stannous octoate, zinc stearate, etc. could also be used. Resins such as polyesters may also require the presence of an organic peroxide as is known in the art. Mixtures of various resins, solvents, or driers are also contemplated.

The thermoparticulating compounds of this invention are urea compounds which decompose between about 60° and about 200° C and produce particles larger than about 25A, the smallest particle size that can be detected with presently-existing monitors. The term "urea compound" is used herein to include thioureas which fall within the scope of the general formula. Specifically, suitable urea compounds have the general formula

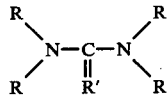

where each R is independently selected from hydrogen, hydroxyl, and alkyl to $C_{20}$. Preferably, each R is hydrogen or alkyl to $C_6$, as these compounds are readily available and work well. The R' in the formula is oxygen or sulfur; preferably, R' is oxygen as those compounds are readily available and work well. Mixtures of urea compounds are also contemplated. The preferred urea compounds are t-butyl urea for its excellent aging characteristics, and n-butyl urea for its low thermoparticulation temperature. Examples of other suitable compounds are given in the examples.

The resinous carrier performs the function of bonding the urea compound to the apparatus since a coating of urea compound by itself does not adhere well. The resinous carrier should be compatible with the other resins used in the apparatus and therefore it is usually advantageous to use the same resin used elsewhere. The resinous carrier is curable at 60° C and is preferably air dryable since it cannot be easily cured in place with heat. Also, it should be stable after curing for several years at 60° C. The resin must be unreactive with the urea compound for otherwise suitable thermoparticulation will not occur. The urea compound and the resin form a mixture and the urea compound does not catalyze the cure of the resin. Epoxy resins are preferred as they are usually used elsewhere in the apparatus, but polyesters, silicone rubber, polystyrene, etc. could also be used.

The solvent for the resinous carrier depends on the particular resinous carrier used. Toluene, xylene, benzene, methyl ethyl ketone, ethyl alcohol, diethyl ether, acetone, cellosolve, etc. are common solvents that may be used. Toluene is preferred as it is inexpensive and dissolves most resins.

The composition is applied to portions of the electrical apparatus which are exposed to the gas stream. The coating does not function as insulation and is usually applied on top of insulation, but it can also be applied to conductors. The application may be made by brushing, spraying, dipping, grease gun, troweling, or other techniques. A suitable coating thickness (after drying) is about 1/16 to about ½ inch. The dispersed particles of urea compound should not be covered with excessive resinous carrier as that may prevent the decomposition particles from escaping into the gas stream. After evaporation of the solvent and room temperature cure of the resinous carrier, if necessary, the apparatus is ready to be operated. When thermoparticulation and the resulting alarm occur, a sample of the gas stream can be collected and analyzed. Since different urea compounds and other thermoparticulating compounds can be used in different areas of the apparatus and their thermoparticulation products are different, analysis of the sample can pinpoint the location of the overheating.

The compositions of this invention are useful in areas of generators which are not subject to temperatures much in excess of 60° or 80° or 100° C (depending on the particular urea compound used). Such areas include the outside surface of the stator windings at the exciter end of a 2-pole, gas-cooled machine with radial gas flow (i.e., at the "cool" end), the outside surface of the stator windings at the exciter end of a water-cooled, 4-pole machine with axial core ventilation, and on the cool end of the stator coil of a 4-pole, gas-cooled machine with axial core ventilation.

The following examples further illustrates this invention.

EXAMPLE 1

The following composition was prepared using various urea compounds:

|  | Parts by Weight |
| --- | --- |
| Urea Compound | 100 |
| Epoxy resin, 50% solids in toluene, made from 200 pbw (parts by weight) linseed fatty acids, 200 pbw styrene, and 300 pbw diglycidyl ether of Bisphenol A, sold by Westinghouse Electric Corporation as "B-276" Varnish (see Example 1 of U.S. Pat. 2,909,497 for detailed description) | 100 |
| 6% solution in low boiling hydrocarbons of cobalt naphthenate | 1.0 |
| 24% solution in low boiling hydrocarbons of lead naphthenate | 0.25 |

The cobalt and lead naphthenate solutions were added to the epoxy resin prior to the addition of the urea compound.

Samples were prepared by brushing the above composition onto 3 inch by 1 inch aluminum sheets 1/16 to ¼ inches thick. The samples were dried overnight at 60° C to form coatings ¼ inches thick, then placed in a forced-air oven at 60° or 80° C for various periods to determine if they were stable and would function after aging.

The samples were placed one at a time in a stainless steel boat within a 1 inch o.d. stainless steel tube. Hydrogen was passed over the samples at flow rate of 6 liters/min. A phase-controlled temperature regulator and programmer controlled the temperature in the boat and the temperature in the boat was measured by mounting a hot junction chromel-alumel thermocouple within a small hole in the boat. The output of the thermocouple and the detector were monitored on a two-pen potentiostatic recorder. A 6° C/min. heating rate was maintained in each experiment after the insertion of the smaple in the boat. The "alarm" temperature at which considerable particulation occurred was taken from the chart; this corresponded to a 50% decrease in the initial ion current of the Generator Condition Monitor (usually from 0.8 mA down to 0.4 mA). The temperature where thermoparticulation began was also noted (i.e., the "threshold" temperature). These two temperatures enabled a "thermoparticulation temperature range" to be recorded for each sample (i.e., the organoparticulation temperature range).

| Urea Compound | Organoparticulation Temperature Range(° C) | Literature Decomposition or Melting Temperature (° C) |
|---|---|---|
| T-butylurea | 160–164 | 176 (dec.) |
| 1,1,3,3-tetramethyl-2-thiourea | >190 | 75–77 |
| hydroxyurea | 161–164 | 144–146 (dec.) |
| n-butylurea | 129–136 | 93–95 |
| sym-diethylurea | 136–139 | 109–110.5 |
| 1,3-dimethylurea | 166–171 | 101–104 |
| ethylurea | 145–148 | 93–96 |
| phenylurea | 154–157 | 145–147 |
| thiourea | 175–181 | 175–178 |
| urea | 182–190 | 133–135 |

EXAMPLE 2

A composition was prepared as in Example 1 using t-butylurea, and was tested after various periods of aging. The following table gives the results.

| Aging Conditions | Organoparticulation Temperature Range (° C) |
|---|---|
| 1 day at 80° C | 160–165 |
| 2 months at 80° C | 162–164 |
| 15 months at 80° C | 160–163 |
| 22 months at 80° C | 163–166 |
| 32 months at 80° C | 164–167 |
| 12.5 months at 100° C | 179–187 |

We claim:

1. A composition curable at room temperature comprising at least one urea compound and a solution of a room temperature, air-dryable epoxy resinous carrier stable at 60° C when cured, and unreactive with said urea compound, said urea compound being selected from the group consisting of t-butylurea, hydroxyurea, n-butylurea, sym-diethylurea, 1,3-dimethylurea, ethylurea, phenylurea, thiourea, and urea.

2. A composition according to claim 1 wherein the amount of said urea compound is about 20 to about 250 phr and the amount of the solvent in said solution is about 25 to about 75% (by weight based on said resinous carrier).

3. A composition according to claim 2 wherein the amount of said urea compound is about 40 to about 60 phr and the amount of said solvent is about 45 to about 55% (by weight based on said resinous carrier).

4. A composition according to claim 1 which includes about 0.1 to about 3 phr of a drier for said epoxy resin.

5. A composition according to claim 4 which is prepared by first mixing said solution of resinous carrier and said drier and then mixing in said urea compound.

6. A composition according to claim 1 wherein the solvent in said solution is toluene.

7. A composition according to claim 1 wherein said urea compound is dispersed in said solution.

8. A method of protecting electrical apparatus from damage due to overheating and for thereafter determining the location of said overheating, said apparatus including a gas stream and a monitor for detecting thermoparticulated particles in said gas stream and for emitting a signal when said particles are detected comprising:
(A) preparing a composition according to claim 1;
(B) applying said composition to said electrical apparatus at positions exposed to said gas stream;
(C) evaporating said solvent; and
(D) monitoring said gas stream for the presence of thermoparticulated particulates therein.

9. A method according to claim 8 including the additional last step of inspecting said applied composition visually for blistered and darkened areas, after a signal has been emitted, to locate the area of overheating.

10. A method according to claim 9 including the additional last steps of collecting a sample of said gas stream after a signal has been emitted, and analyzing said sample.

11. A thermoparticulating coating comprising a solid layer of a room temperature, air-dried epoxy resinous carrier containing a urea compound selected from the group consisting of t-butylurea, hydroxyurea, n-butylurea, sym-diethylurea, 1,3-dimethylurea, ethylurea, phenylurea, thiourea, and urea.

12. A coating according to claim 11 which is about 1/16 to about ½ inches thick.

13. A thermal detection system for electrical apparatus cooled by a gas stream, comprising a thermoparticulating coating on a portion of said electrical apparatus exposed to said gas stream and a monitor for detecting the presence of thermoparticulated particles in said gas stream, said coating comprising a solid layer of a room temperature, air-dried epoxy or polyester resinous carrier containing a urea compound having the general formula

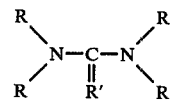

where each R is independently selected from hydrogen, hydroxyl, and alkyl to $C_{20}$, and R' is oxygen or sulfur.

14. A method according to claim 8 wherein the amount of said urea compound is about 20 to about 250 phr and the amount of the solvent in said solution is about 25 to about 75% (by weight based on said resinous carrier).

15. A method according to claim 14 wherein the amount of said urea compound is about 40 to about 60 phr and the amount of said solvent is about 45 to about 55% (by weight based on said resinous carrier).

16. A method according to claim 8 which includes about 0.1 to about 3 phr of a drier for said epoxy resin.

17. A method according to claim 16 which is prepared by first mixing said solution of resinous carrier and said drier and then mixing in said urea compound.

18. A method according to claim 8 wherein the solvent in said solution is toluene.

19. A method according to claim 8 wherein said urea compound is dispersed in said solution.

20. A thermal detection system according to claim 13 wherein each R is independently selected hydrogen and alkyl to $C_6$.

21. A thermal detection system according to claim 13 wherein R' is oxygen.

22. A thermal detection system according to claim 13 wherein said urea compound is t-butylurea.

23. A thermal detection system according to claim 13 wherein said urea compound is n-butylurea.

24. A thermal detection system according to claim 13 wherein the amount of said urea compound is about 20 to about 250 phr and the amount of the solvent in said solution is about 25 to about 75% (by weight based on said resinous carrier).

25. A thermal detection system according to claim 24 wherein the amount of said urea compound is about 40 to about 60 phr and the amount of said solvent is about 45 to about 55% (by weight based on said resinous carrier).

26. A thermal detection system according to claim 13 wherein said resinous carrier is an epoxy resin.

27. A thermal detection system according to claim 26 which includes about 0.1 to about 3 phr of a drier for said epoxy resin.

28. A thermal detection system according to claim 27 which is prepared by first mixing said solution of resinous carrier and said drier and then mixing in said urea compound.

29. A thermal detection system according to claim 13 wherein the solvent in said solution is toluene.

30. A thermal detection system according to claim 13 wherein said urea compound is dispersed in said solution.

* * * * *